United States Patent [19]

Stankovic et al.

[11] Patent Number: 5,510,698
[45] Date of Patent: Apr. 23, 1996

[54] MARKOV CHAIN CONTROLLED RANDOM MODULATION OF SWITCHING SIGNALS IN POWER CONVERTERS

[75] Inventors: Aleksandar M. Stankovic, Cambridge; George C. Verghese, Newton; David J. Perreault, Brookline, all of Mass.

[73] Assignee: Massachusetts Institute of Technology, Cambridge, Mass.

[21] Appl. No.: 102,629

[22] Filed: Aug. 5, 1993

[51] Int. Cl.⁶ .................................................. G05F 1/44
[52] U.S. Cl. .......................................... 323/282; 323/283
[58] Field of Search .............................. 363/98, 97, 95, 363/132, 101, 16, 17, 131; 323/222, 265, 282, 283

[56] References Cited

U.S. PATENT DOCUMENTS

| | | | |
|---|---|---|---|
| 3,599,864 | 8/1971 | Liddle | 236/78 |
| 4,079,202 | 3/1978 | Payne | 179/15 BW |
| 4,727,308 | 2/1988 | Huljak et al. | 323/222 |
| 4,967,389 | 10/1990 | Omura et al. | 364/900 |
| 4,975,819 | 12/1990 | Lannuzel | 363/16 |
| 4,977,492 | 12/1990 | Kirchberg, Jr. et al. | 363/41 |
| 4,988,942 | 1/1991 | Ekstrand | 323/282 |
| 4,994,956 | 2/1991 | Kirchberg, Jr. et al. | 363/95 |
| 5,149,933 | 9/1992 | Donner | 219/113 |
| 5,164,892 | 11/1992 | Kimbara | 363/131 |

OTHER PUBLICATIONS

Leung, Frank H. F., and Peter K. S. Tam, "An Adaptive Digital Controller for Switching Dc–dc Converters", *1991 IEEE Conference on Industrial Electronics, Control and Instrumentation*, Kobe, Japan, Oct.–Nov. 1991, pp. 507–512.

Lin, Bor–Ren, "Analysis of Fuzzy Control Method Applied to Dc–Dc Converter Control", *Applied Power Electronics Conference*, San Diego, California, Mar. 1993, pp. 22–28.

Stankovic, A. M., G. C. Verghese and R. O. Hinds, "Monte–Carlo Verification of Power Spectrum Formulas for Random Modulation Schemes", *IEEE Workshop on Computers in Power Electronics*, Berkeley, California, Aug. 1992, pp. 187–194.

*Primary Examiner*—Peter S. Wong
*Assistant Examiner*—Adolf Berhane
*Attorney, Agent, or Firm*—Samuels, Gauthier & Stevens

[57] ABSTRACT

Markov chain controlled random modulation of switching signal sequences of for a power converter. The control is implemented in a power converter having an energy storage device which receives an input power from a source and provides an output power to a load. The converter includes a switching device for coupling the input power source to the energy storage device or coupling the storage device to the load in response to receiving a sequence of control signals generated from a control signal generator. The control signal generator includes a switching signal generator for providing a nominal switching signal sequence which achieves steady state between the input power to the converter and the output power supplied to the load, a modulator for modulating the nominal switching signal sequence with a source of non-deterministic signals to produce a time modulated switching signal sequence, and a control device for controlling the modulator in response to determining the previous modifications performed to the nominal switching signal sequence to maintain a predetermined range of deviation between the time modulated switching signal sequence and the nominal switching signal sequence.

24 Claims, 9 Drawing Sheets

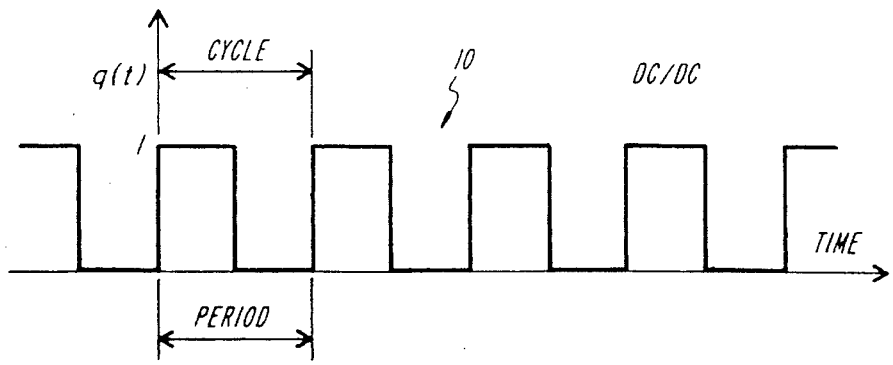
FIG. 1A
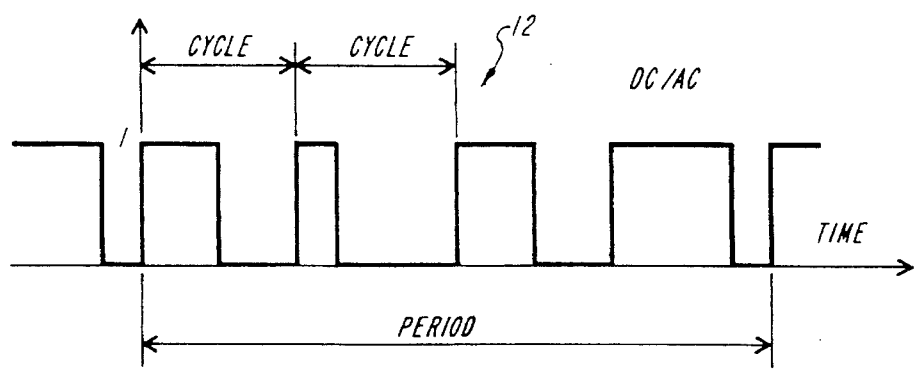
FIG. 1B
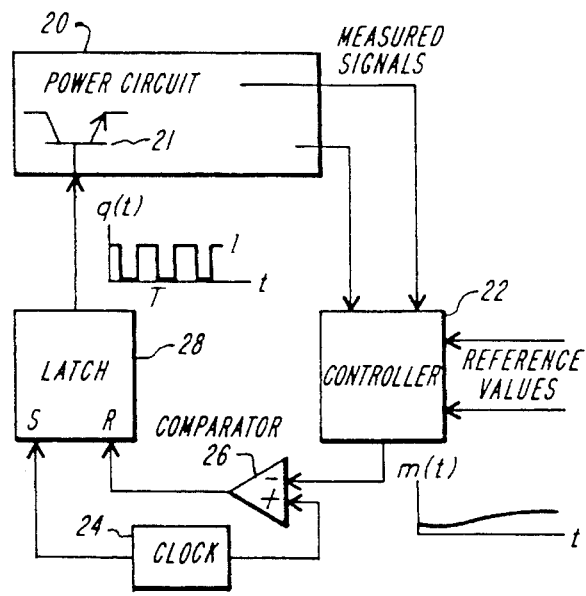
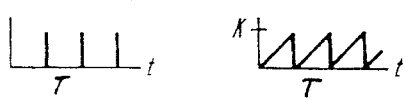
FIG. 2A

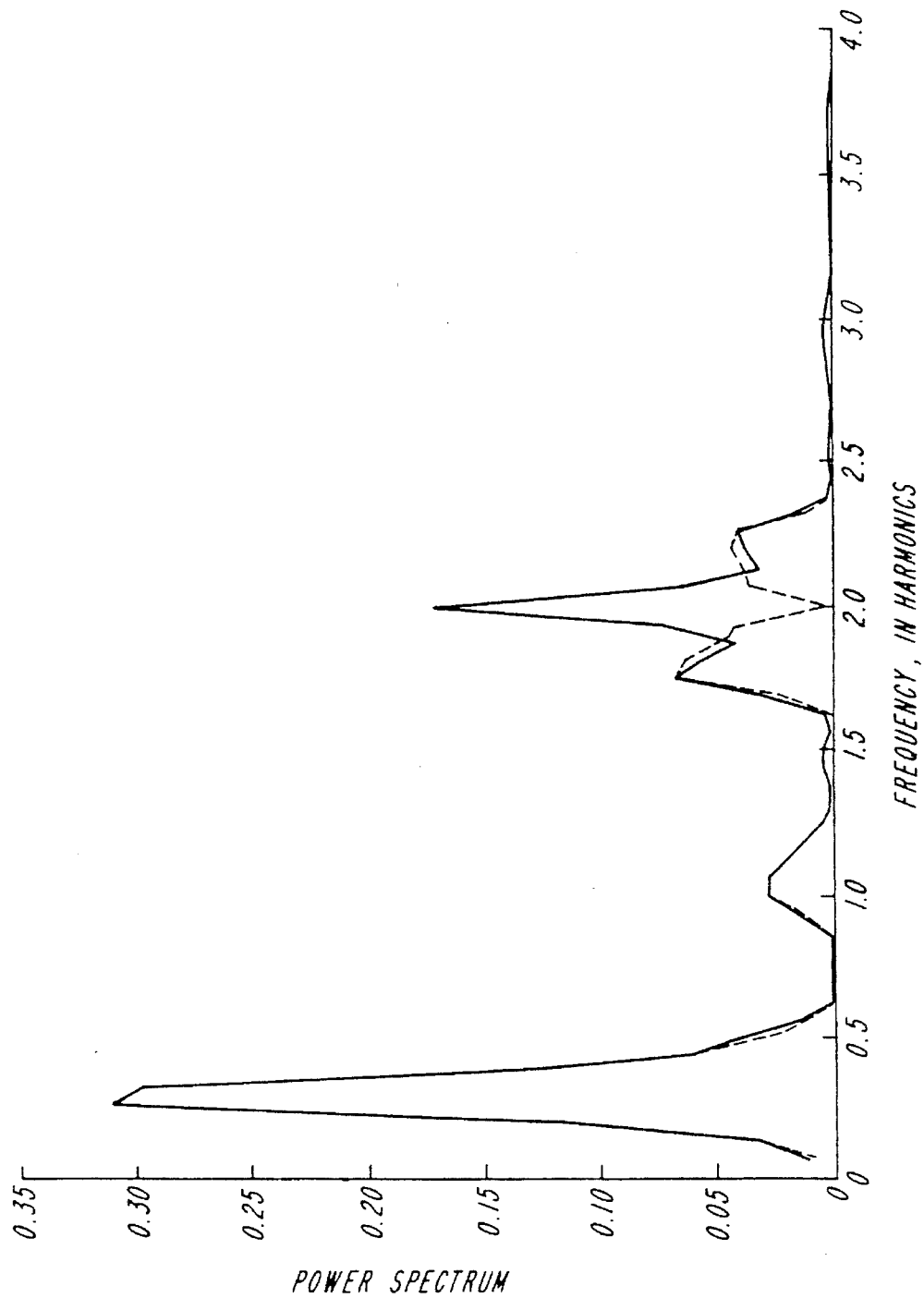

MARKOV CHAIN CONTROLLED RANDOM MODULATION OF SWITCHING SIGNALS IN POWER CONVERTERS

BACKGROUND OF THE INVENTION

The invention relates to Markov chain control of random modulated switching signals in a power converter.

Switching power converters are the most widespread systems in the area of power conditioning. The reasons for their popularity are numerous, the most outstanding being their ability to achieve a very high efficiency of operation, the capability to operate at different voltage and current levels, and the relative abundance of circuit topologies that can be matched to various requirements. The control of switching converters is an area of intensive growth. There exists an array of interesting control problems, motivated primarily by the wide range of operating conditions characterizing a power converter and the very constrained nature of control actions, for instance, one can only choose the instants at which power switches are closed or opened, to select one of a fairly small total number of circuit configurations. Many questions in power converter control are still not answered in sufficient detail (e.g. geometrical control, digital implementations), while a host of new questions arise naturally when the robustness of operation is considered.

The switching function for a given power switch, denoted by q(t), is a time waveform taking the value 1 when the switch is on, and the value 0 when the switch is off. In the case of DC/DC converters, the nominal switching function is typically periodic, with a period equaling the duration of a single on-off cycle, as shown in the switching function 10 of FIG. 1A. In the case of DC/AC converters, the nominal switching function is often periodic, with a period that comprises several on-off cycles, as indicated by the switching function 12 of FIG. 1B.

As shown in FIGS. 2A and 2B, a conventional switching process for a power converter 20 involves generating a switching function q(t) for a switching device 21 with a configuration including a controller 22, a clock 24, a comparator 26, and a latch 28. In this configuration, the reference values fed to the controller 22 reflect the desired steady-state quantities (e.g. voltages and currents). Any necessary feedback control signals are combined with these reference values to specify the modulating signal m(t), which in turn determines q(t). Since power converters generally operate in a periodic steady state, converter waveforms of interest are typically periodic functions of time in the steady state.

Converter waveforms which are periodic functions of time in general have spectral components at all integer multiples of the fundamental frequency. The allowable harmonic content of some of these waveforms is often constrained, an example is the current in the interface to the electric utility, when it is desirable to have only the 60 Hz fundamental component present. In this case, stringent filtering requirements may be imposed on the power converter operation. Since the filter size is in general related to these requirements, a significant part of a power converter's volume and weight can be due to an input or output filter. This conflicts with requirements to miniaturize power supply components, which have been the driving force behind much of modern power electronics.

Similar requirements hold for acoustic noise control in motor applications. Harmonic components of the motor voltages and currents may excite mechanical resonances, leading to increased acoustic noise and to possible torque pulsations. Present solutions to these problems include either a costly mechanical redesign, or an increase in the switching frequency in the power converter supplying the motor, which in turn increases the switching power losses.

In conventional random modulation processes, a signal with appropriately chosen statistical properties is added to the reference values utilized in the control configuration of FIG. 2A. This has the effect of randomly "dithering" q(t) from its nominal form. The randomization can alter the harmonic content of waveforms of interest without excessively affecting the proper operation of the converter. In terms of FIGS. 1A and 1B, randomization occurs in each cycle of the reference waveform.

As a common ground for comparisons among different random modulation methods is needed, it is useful to concentrate on the switching function q(t), which Can take only 0–1 values. Quantities of interest in a switching cycle are total cycle duration, duration of the on-portion of the cycle, and the position of the on-portion within the cycle. The ratio of the duration of the on-portion to the total cycle length is called the duty ratio. Many waveforms of interest in implementations are related to such a pulse train via linear transformations (e.g. a simple integral in the case of the input current of a boost converter). The power spectrum of variables related to q(t) by linear, time-invariant (LTI) operations can easily be derived from the power spectrum of q(t). The power spectrum of many other waveforms of interest can be derived by methods similar to those used for q(t).

The main elements characterizing a random modulation process are the time variation of the nominal (non-randomized) switching pattern and the time variation of the probability laws that govern the randomization. First, it is necessary to determine if the nominal patterns, e.g. duty ratios, vary from one cycle to the next, as they do in inverter operation. This property defines the deterministic structure of the modulation. The other issue is the time variation of the probability densities used to determine the "dither" at each cycle. This component is thought of as the probabilistic structure of the modulation.

If both the deterministic and probabilistic structures are constant in time (implying DC/DC operation), the switching will be called stationary. In block-stationary random modulation, the nominal pattern varies from cycle to cycle, but is repeated periodically over a block of cycles, as needed for inverter (DC/AC) operation. The present invention considers a third type of structure, where the probability density used for dither in each cycle depends on the state of a Markov chain at the beginning of that cycle. It will hereinafter be described that switching based on a Markov chain enables explicit control of the ripple, while maintaining analytical tractability.

Stationary switching processes can be further classified, and the most important classes are randomized pulse position modulation (PPM), randomized pulse width modulation (PWM), and asynchronous randomized modulation. FIG. 3 shows one cycle of the switching waveform; $T_i$ is the duration of the i-th cycle, $a_i$ is the on-time within a basic switching cycle, and $\epsilon_i$ is the position of the turn-on within the cycle. The duty ratio is $d_i = a_i/T_i$. All switching functions q(t) that are analyzed in with respect to the present invention consist of concatenations of such switching cycles. In general, $\epsilon_i$, $d_i$ or $T_i$, can be dithered, individually or simultaneously. Some combinations used in power electronics are as follows:

Random PPM: $\epsilon_i$ changes; $T_i$, $a_i$ fixed.

Random PWM: $a_i$ changes; $\epsilon_i=0$; $T_i$ fixed. Within random PWM, $d_i$ can be varied either continuously, or it can take finitely many distinct values.

Asynchronous modulation: $T_i$ changes; $\epsilon_i=0$; $d_i$ fixed.

Simplified asynchronous modulation: $T_i$ is varied, $a_i$ is fixed, $\epsilon_i=0$.

Some other possibilities involve varying more than one variable simultaneously, or dithering their sums, differences and the like:

Vary $T_i$ and $d_i$ simultaneously, $\epsilon_i=0$, with predetermined time averages, Vary independently the "on" and "off" times, with predetermined averages. An example of this kind is the random telegraph wave with different transition rates from 0 to 1 and from 1 to 0.

The main benefit of such processes in the case of converters supplying motors is acoustic noise reduction and torque pulsation reduction, and filter size reduction in all classes of power electronic converters. However, a possible practical drawback of conventional random modulation is the absence of a time-domain characterization. While the power spectrum of a waveforms of interest can now be accurately predicted, measured or estimated, there is no guarantee that the time domain waveform will not deviate arbitrarily from its desired average. This is a consequence of the commonly used random modulation procedure, which is based on statistically independent random experiments (trials).

According to the present invention, there is described a family of random modulation processes that are based on Markov chains that enable both deterministic and stochastic descriptions of time domain waveforms, in addition to the spectral shaping. Analytical formulas describing random modulation based on Markov chains are slightly more complicated than the corresponding formulas for the independent modulation case. These formulas, however, are used for switching strategy assessment and optimization (off-line), thus making the calculations entirely tractable.

SUMMARY OF THE INVENTION

It is therefore an object of the present invention to provide switching signal modulation based on Markov chains as a means to explicitly impose time-domain constraints on the switching waveform, while shaping the spectrum.

Switching based on a discrete-state Markov chain possesses additional generality when compared to the randomized switching strategies described earlier. A waveform segment of length $T_i$ is associated with the Markov chain being in the i-th state. As the chain makes a transition from one state to the next, the segment corresponding to the next state is joined to that from the present state. Piecing such segments together forms the switching waveform. The switching pattern in any cycle is dependent on the state of the underlying Markov chain, while the choice of the next state is determined probabilistically. This introduces considerable flexibility in shaping time-domain and frequency-domain behavior. State transition probabilities can be chosen so that large deviations from desired average steady-state behavior are discouraged or prevented altogether. For instance, a short duty ratio can be made very likely after a long one in randomized pulse width modulation (PWM). Similarly, in pulse position modulation (PPM), a short delay can be discouraged after a long one, to prevent a large "local" on-time and thereby reduce the current ripple. In the case when certain switching patterns are not allowed altogether, the term "hard reflecting wall" is used to describe the behavior of the local average. The term "soft reflecting wall" is used in the case when some switching patterns are still possible, but their probability of occurrence is determined via the Markov chain transition probabilities.

The beneficial features of the Markov chain controlled modulation process for power converters include: shaping of power spectra for signals of interest (with main benefits being reduced size and price of filters needed to meet the filtering specifications, reduced acoustic noise in inverter applications, reduced torque pulsations in motors supplied by power electronic converters), and explicit control of the time domain characteristics for the same signals of interest, with both deterministic and statistical requirements allowed.

Accordingly, the present invention provides a power converter having an energy storage device which receives an input power from a source and provides an output power to a load, the converter including switching means for coupling the input power source to the energy storage device or coupling the storage device to the load in response to receiving a Sequence of control signals generated from a control signal generator. The control signal generator comprises switching signal means for providing a nominal switching signal sequence which achieves steady state between the input power to the converter and the output power supplied to the load, modulating means for modulating the nominal switching signal sequence with a source of non-deterministic signals to produce a time modulated switching signal sequence, and control means for controlling the modulation means in response to determining the previous modifications performed to the nominal switching signal sequence to maintain a predetermined range of deviation between the time modulated switching signal sequence and the nominal switching signal sequence.

BRIEF DESCRIPTION OF THE DRAWINGS

FIGS. 1A and 1B respectively show nominal switching functions for a DC/DC converter and a DC/AC converter;

FIGS. 2A and 2B respectively show a conventional configuration for switching signal generation and associated randomized switching functions;

FIG. 14 shows estimated and calculated continuous spectrum for the aperiodic asynchronous Markov chain of FIG. 13;

DETAILED DESCRIPTION OF THE ILLUSTRATED EMBODIMENTS

Figure 2B:
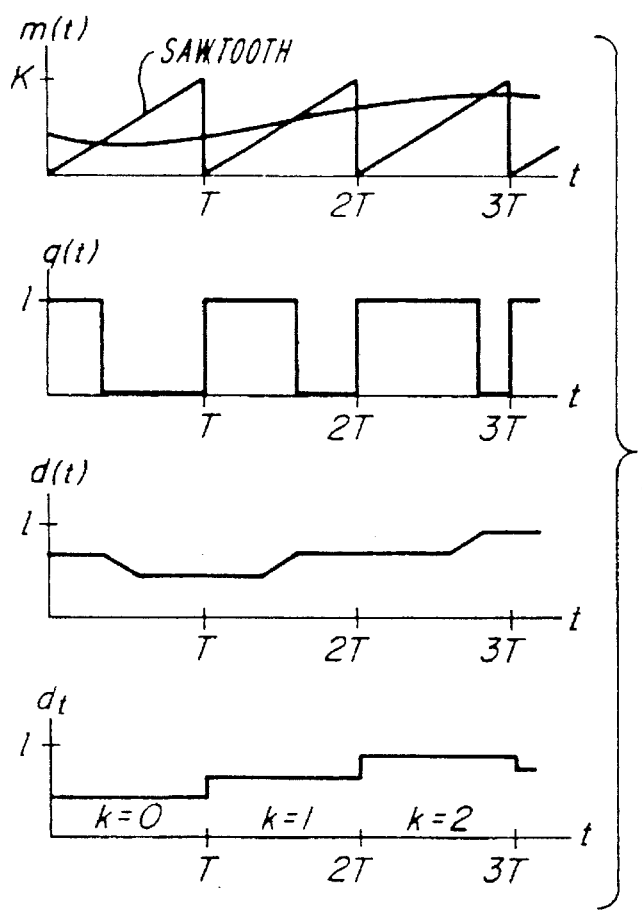
Figure 3:
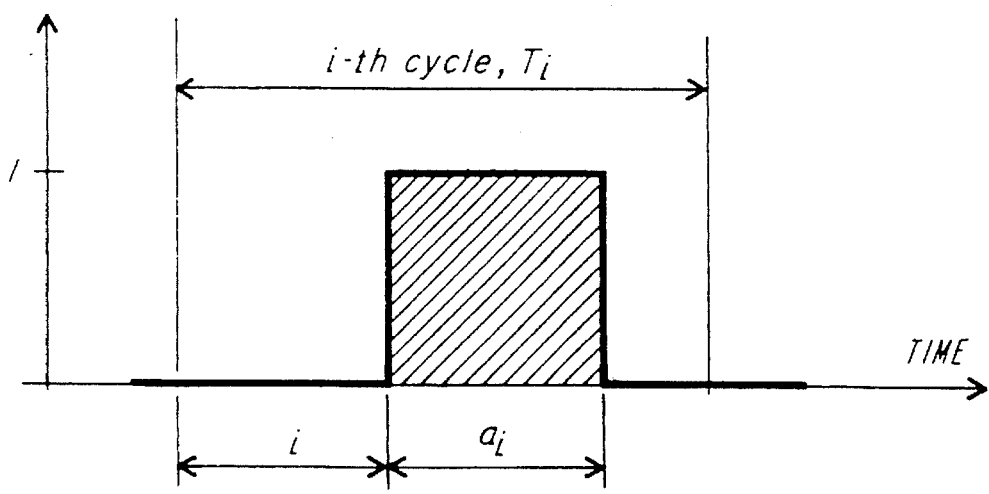
FIG. 3 shows one cycle of a switching waveform.
Figure 4:
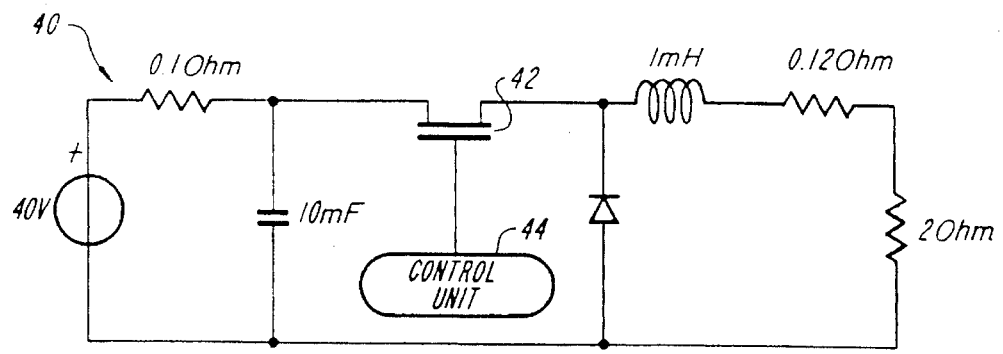
FIG. 4 shows a block diagram of a buck (down) converter utilizing the Markov chain modulation control of the present invention.
Figure 5:
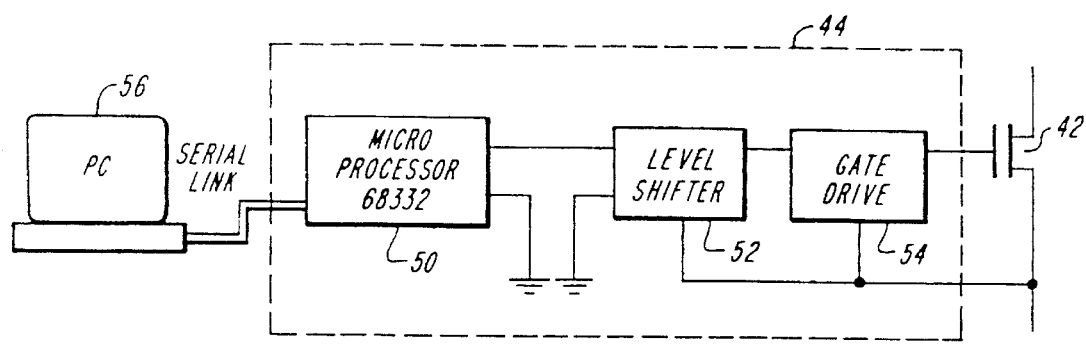
FIG. 5 shows a block diagram of a control unit in accordance with the present invention.

For illustrative purposes, the Markov chain random modulation process in accordance with the present invention is shown implemented with a buck (down) converter circuit 40 in FIG. 4. The fundamental switching frequency in this circuit is 10 kHz. In the circuit 40, the switching of a switching device 42, such as a transistor, is controlled by a control unit 44. The control unit 44, as shown in FIG. 5 for example, includes a programmable microprocessor 50, a level shifter 52, and a gate drive 54. The microprocessor 50 is in turn connected to a personal computer 56 or equivalent to facilitate development of the microcode for random switching.

It will be appreciated by those of skill in the art that a microprocessor is not a required Component of a Markov chain controlled random modulation. In the exemplary system provided, the process of prototyping has been greatly simplified by microprocessor versatility. Hardware units that are necessary in alternative system implementations include a conventional random number generator (RNG) or a psuedo random number generator and a state machine. A conventional RNG is a true random source, e.g. by measuring thermal noise on a physical system, while a psuedo RNG utilizes algorithms to generate a random sequence. An implementation with these units is likely to be not only cheaper, but it could operate at higher (MHz) switching frequencies.

The present invention will now be described with respect to the class of stationary random modulation processes in which the switching signal sequence q(t) comprises a sequence of waveform segments, each of length $T_i$, governed by Markovian probabilistic laws.

Switching based on a Markov chain possesses additional generality when compared to the randomized switching strategies described above. A waveform segment of length $T_i$ is associated with the Markov chain being in the i-th state. Since a switching pattern in one cycle can be made dependent on the state of the underlying Markov chain, an additional degree of flexibility is available. State transition probabilities can be chosen so that large deviations from desired average steady-state behavior are discouraged or prevented altogether. For instance, a short duty ratio can be made very likely after a long one in randomized PWM. Similarly, in PPM, a short delay $\epsilon_i$ can be discouraged after a long $\epsilon_{\{i-1\}}$, to prevent a large "local" on-time, and thereby reduce the current ripple.

The Markov chains analyzed herein are discrete-time chains with finitely many states (e.g., n), and a continuous-time 0–1 waveform is associated with the evolution of the chain. Let Π(k) be 1×n row vector whose i-th entry $\Pi_i(k)$ is the probability that at the k-th stage the system is in state i. Then the evolution of Π is governed by the equation $$\Pi(\kappa+1) = \Pi(\kappa) P^* \qquad (1)$$

$P^*$ is the n×n state-transition matrix, and its (i,j)-th element is the probability that at the next transition the chain goes to state j, given that it is currently in state i. Although $P^*$ can also depend on k, we shall only consider the case of time-invariant (or homogeneous) chains, where $P^*$ is constant. In each state of the chain, a cycle of the switching waveform is generated. The lengths of the cycles can be equal for all states, in which case the chain is called synchronous (i.e., $T_i$ equal for all i). Otherwise, the Markov chain is denoted as asynchronous.

The field of Markov chain analysis uses a specialized terminology, and a brief list of important results is hereinafter provided. A Markov chain is irreducible if every state can be reached from every other state. The state i is recurrent (or essential) if the chain can eventually return to i from every state that may be reached from i; every state in an irreducible chain is therefore recurrent. A recurrent state to which the chain can return only after an integer multiple of d transitions (d≧2) is called a periodic state, with period d. The property of irreducibility, which is assumed for this explanation, implies that, if any state is periodic, then the periods of all states are the same.

A Markov chain with finitely many states is classified as ergodic if it is irreducible and aperiodic (i.e. has no periodic states). The limiting state probability $\Pi_i$ of the state i is the probability that the chain is in state i after a great many state transitions. This quantity is independent of the initial state under ergodicity assumptions. In homogeneous Markov chains, the probability distribution for the time spent in each state (holding time) is a geometric random variable.

The next task is to establish relations linking the discrete-time Markov chain that governs the generation of the switching function with the continuous-time switching function q(.). This connection is complicated by the fact that switching cycles corresponding to individual states of the chain could have different durations $T_i$ (in the case of asynchronous chains). It turns out that a convenient way to achieve that goal is the mechanism of recursive Markov chains which will be described hereinafter.

The stationarization procedure for Markov chains will be described. Initially, consider the case of an ergodic (i.e. aperiodic and irreducible) Markov chain with finitely many states, i.e., the case when limiting or steady-state probabilities exist. Let x(.) be the waveform obtained by a concatenation of the cycles associated with the states that the chain visits in a particular realization of the random process. The product x(t+τ)x(t) depends on both t and τ, in general. Let s(t) denote the state of the chain at time t and let T' denote the expected duration of a cycle in the steady state. The probability Pr[s(t+τ)=j, s(t)=i] is needed to evaluate the autocorrelation. The number m' of state transitions between t and t+τ is a member of a set of mutually exclusive and collectively exhaustive events. Let the maximal number of state transitions in the interval 2T' under consideration be M; note that M'T/2T'→1. Then, $$Pr[s(t+\tau) = j, s(t) = i] = \sum_{m=1}^{M} Pr[s(t+\tau) = j, s(t) = i, m' = m] \qquad (2)$$

The right hand side of this equation can be evaluated using a derivation described later. The procedure is based on a random incidence assumption, in addition to taking the expectation in the autocorrelation calculation. It is assumed that the Pr[s(t)=i] equals $\Pi_i$, where $\Pi_i$ is the steady-state probability of the state i. In that case, the right hand side of equation (2) can be evaluated, using an m-fold convolution of the state transition matrix. An autocorrelation calculated in this way is time-averaged (via the steady-state probabilities), and depends on $\tau$ only. The corresponding power spectrum is labelled as the mean or time-average power spectrum.

In the special case of synchronous transitions with a cycle duration T, the calculations are simplified. For a given $\tau>0$, the number of transitions m equals either the integer part of $\tau/T$, or exceeds this by 1.

In the case of periodic Markov chains, the state goes through N−1 other classes before returning to the starting class $C_i$ as will be discussed hereinafter. A conditioning is added in the calculation of the autocorrelation, where Pr[s(t+$\tau$)=j, s(t)=i| s(t)$\in C_i$] is used instead of Pr[s(t+$\tau$)=j, s(t)=i]. The random incidence assumption yields the probability of the event s(t)$\in C_i$ which equals $T_i/\Sigma_{j=1}^{N} T_j$, where $T_j$ is the expected length of a waveform segment generated in the class $C_j$ in the steady state. The other steps in the calculation of the power spectrum are the same as in the aperiodic case, with the same simplifications if a synchronous Markov chain is considered.

Ergodic Markov chains (i.e irreducible and aperiodic chains) are now considered. The goal is to analyze the continuous-time switching waveforms associated with an n-state discrete-time Markov chain. The chain is characterized by the n×n state transition matrix $P^*=[P^*_{k,l}]$. This matrix is a stochastic matrix, i.e. its rows sum to 1.

At a state transition from state k, a switching cycle of length $T_k$ is generated, and the switching function q(t) is a concatenation of such cycles. The main source of analytical difficulties is the fact that cycle durations could be different for different states, so care needs to be exercised when the continuous-time switching waveform is related to the discrete-time Markov chain used for random modulation.

It will be assumed throughout the present description that the Markov chain is in steady state. The steady state probabilities of the chain can be found from:

$$\Pi P^* = \Pi \qquad (3)$$

$$\sum_{i=1}^{n} \Pi_i = 1 \qquad (4)$$

The vector $\Pi$ is thus the normalized left eigenvector of the matrix $P^*$ corresponding to the eigenvalue 1, and its existence follows from the assumed ergodicity properties of the underlying Markov chain.

Let T" be the average transition time:

$$T" = \sum_{k=1}^{n} \Pi_k T_k \qquad (5)$$

Figure 6:
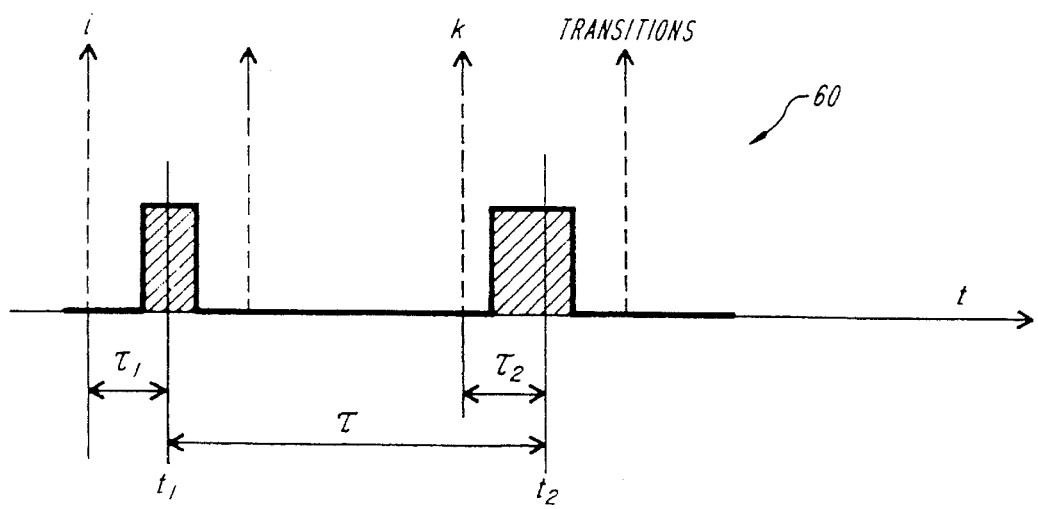
FIG. 6 shows a waveform generated by a Markov chain.

The next task is to find the autocorrelation of the continuous-time waveform generated by a Markov chain, assuming a random incidence. A typical waveform 60 is shown in FIG. 6. Let the waveform in the switching cycle of duration $T_k$ associated with the state k be $u_k$, and let u be an n-vector with entries $u_k$. The number m' of state transitions between t and t+$\tau$ is a member of a set of mutually exclusive and collectively exhaustive events. If $\tau>0$ and m'$\geq$1, $$R_y(\tau) = \sum_{m'=1}^{M} R_y(\tau|m' = m) \qquad (6)$$

where $R_y(\tau|m'=m)$ denotes E[y(t) y(t+$\tau$)|m'=m].

Referring to FIG. 6, the components that go into computing this conditional autocorrelation can be identified. Random incidence at time $t_1$ will be assumed. The probability of being in state i at $t_1$ is $\Pi_i$. The time of incidence relative to the start of the switching cycle in this incident cycle is denoted by $\tau_1$. At time $t_2=t_1+\tau$, the waveform is in state k, m transitions later. This time, relative to the start of the associated switching cycle, is denoted by $\tau_2$. The probability of being in state k after m transitions is given by the (i,k)-th entry of $P^m$. Weighting the product $u_i(\tau_1)u_k(\tau_2)$ by the appropriate probabilities and averaging in time yields the desired result. In general, for m'=m, the autocorrelation is obtained from $$R_y(\tau|m'=m) = \qquad (7)$$

$$\int_0^{TM} \int_0^{TM} \frac{u^T(\tau_1)}{T"} \Theta Q^m(\tau+\tau_1-\tau_2)u(\tau_2)d\tau_1 d\tau_2$$

In this expression $\Theta=\text{diag}(\Pi_i)$, $T_M$ denotes $\max_k T_k$, $Q(\sigma)$ is the n×n matrix whose (k,l)-th entry is $$Q_{k,l}=P^*_{k,l}\delta(\sigma-T_k) \qquad (8)$$

and $Q^m(.)$ denotes the m-fold convolution of Q(.) with itself, with $Q^0=I$. The m-fold convolution of the $\delta$-functions in the definition of Q serves to keep track of all the possible combinations of m cycle lengths between $t_1$ and $t_2$. Because of the steady state assumption, the time average can be computed via integrals over length just $T_M$, scaled by the factor T" that appears in equation (7).

Let M denote the maximal number of state transitions in a truncated realization of length 2T'. Note that MT"/2T'$\to$1, as T'$\to\infty$. Let $S_y^+(f)$ be the Fourier transform of $R_y(\tau|m'\geq 0)$ for $\tau>0$, and $S_y^-(f)$ be the Fourier transform of the same autocorrelation for $\tau<0$. Then, after the symmetrical truncated realization of the signal y of duration M T" is introduced as yielding (after neglecting certain terms that vanish as M$\to\infty$)

$$S_y^+(f) = \lim_{M\to\infty} \sum_{m'=0}^{M} R_y(\tau|m") e^{-i2\pi f\tau}d\tau \qquad (9)$$

$$S_y^+(f) = \lim_{M\to\infty} \int_0^{MT"} \sum_{m'=0}^{M} \int_0^{TM} \int_0^{TM} \frac{u^T(\tau_1)}{T"} \Theta \qquad (10)$$

$$Q^m(\tau+\tau_1-\tau_2)u(\tau_2)d\tau_1 d\tau_2 e^{-i2\pi f\tau}d\tau$$

By defining $\sigma=\tau+\tau_1-\tau_2$ and recognizing appropriate terms, results in $$S_y^+(f) = \frac{1}{T"} U^T(-f)\Theta F(f)U(f) \qquad (11)$$

where U(f) is the Fourier transform of the vector u(t) and $$F(f) = \sum_{m=0}^{\infty} (\hat{Q}(f))^m \qquad (12)$$

and $Q^{\wedge}(f)$ is the Fourier transform of the matrix $Q(\sigma)$. From the construction $Q^{\wedge}_{k,l}(f)=[P_{k,l}e^{-i2\pi T_k f}]$. Assuming that the eigenvalues of $Q^{\wedge}(f)$ have moduli less than 1, the geometric series involving $Q^{\wedge m}(f)$ converges yielding $$F(f)=(I-Q(f))^{-1} \qquad (13)$$

Using the fact that $S_y^-(f)=S_y^+(-f)$, we arrive at the spectral formula:

$$S_{cy}(f)=U(f)^H[\Theta F(f)+(\Theta F(f))^H-\Theta]U(f) \qquad (14)$$

The subscript c is used to emphasize that this is a continuous spectrum.

If Q(f) has eigenvalues of modulus 1, the spectrum will have discrete components located at k/T, where k is any positive integer and T is the greatest common denominator of the $T_k$'s. Asymptotic properties of Q(f=k/T) establish that at f=k/T $$\lim_{M \to \infty} \frac{1}{M} \sum_{m'=1}^{M} Q(f)^{m'} = 1_n \Pi^T \quad (15)$$

where $1_n$ is an n-vector of ones. The final result for the intensities of the lines in the discrete spectrum is $$S_{dy}\left(\frac{k}{T}\right) = \frac{1}{(T')^2} \left| \Pi U\left(\frac{k}{T}\right) \right|^2 \quad (16)$$

In the case of Markov chains with synchronous transitions, with the time between transitions T, $Q(f) = P\ e^{-i2\pi f/T}$, and its eigenvalues have moduli <1, for $f \neq k/T$, $k \in Z$.

An exemplary switching function modulation with a 4-state Markov chain, intended for use in a DC/DC converter, is considered next. This chain corresponds to the following switching policy:

Either long (L, D=0.75) or short (S, D=0.25) pulses can be fired.

The controller observes the last two pulses and if they are SL or LS, then either L or S is fired with probability 0.5.

If the pair observed is LL, then an S pulse is applied with probability 0.75 (and an L pulse with probability 0.25).

If the pair observed is SS, then an L pulse is applied with probability 0.75 (and an S pulse with probability 0.25).

Figure 7:
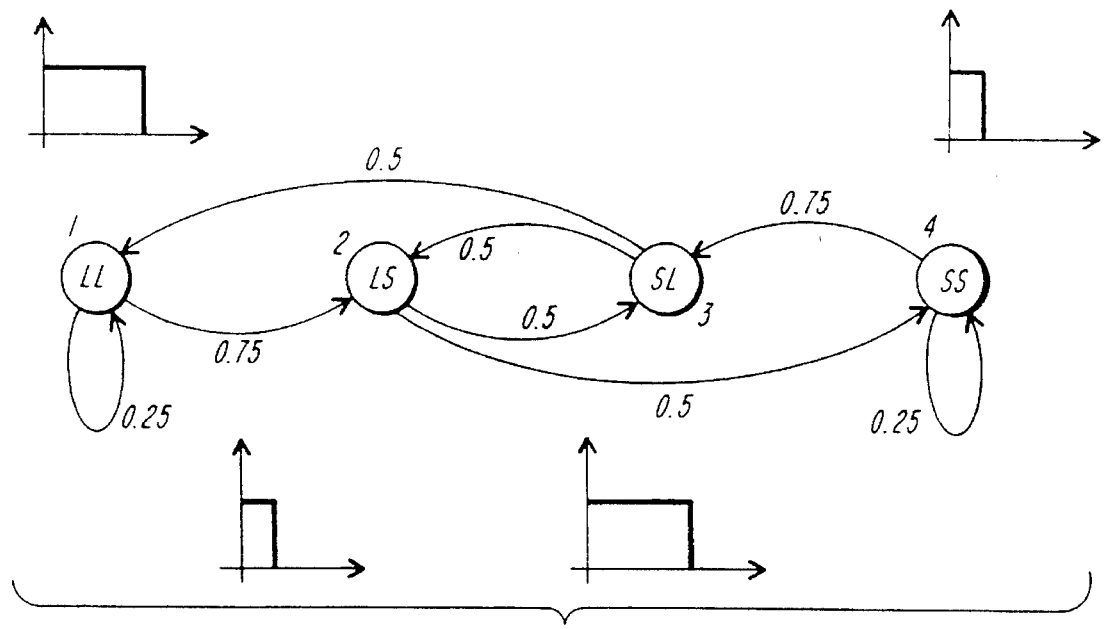
FIG. 7 shows an exemplary four state Markov chain based random switching.

Thus if two pulses of a given type occur in succession (LL or SS), the probability that the next pulse is of the opposite type is increased ("soft reflection"). The corresponding Markov chain is illustrated in FIG. 7, and the associated state transition matrix is:

$$P^* = \begin{bmatrix} 0.25 & 0.75 & 0 & 0 \\ 0 & 0 & 0.5 & 0.5 \\ 0.5 & 0.5 & 0 & 0 \\ 0 & 0 & 0.75 & 0.25 \end{bmatrix} \quad (17)$$

The exemplary Markov chain is ergodic so the limiting probabilities exist, satisfying $$\Pi P^* = \Pi \quad (18)$$

This Markov chain is an example of a discrete-transition chain. At each transition, given the current state of a chain, the next state is determined by a probabilistic experiment which is specified by probabilities assigned to branches emanating from the current state. In the example provided, given that the chain is in state 1, the next state could be either state 2 (with probability 0.75), or the state 1 (with probability 0.25). These transition probabilities can be conveniently arranged in the matrix P*. The random drawing needed to determine the actual transition is performed by a random number generator or programmable microprocessor that has suitable statistical properties.

Limiting (steady-state) probabilities of a Markov chain are defined as probabilities that at a given Markov chain will be in the corresponding state after a large number of state transitions. Alternatively, limiting state probabilities could be interpreted as the average proportion of time which the chain spends in each state. Arranging these probabilities in a row-vector $\Pi$, using standard Markov chain theory, results in $$\Pi = [0.2\ 0.3\ 0.3\ 0.2] \quad (19)$$

The matrix P belongs to the class of irreducible stochastic matrices, for which all eigenvalues have modulus less than or equal to 1, $\lambda=1$ is a simple eigenvalue and other eigenvalues of modulus 1 (if they exist) are simple and correspond to a complex root of 1 of appropriate order. $\Pi$ is a left eigenvector corresponding to $\lambda=1$ and the corresponding right eigenvector is $[1\ 1\ 1\ 1]^T$.

Figure 8A:
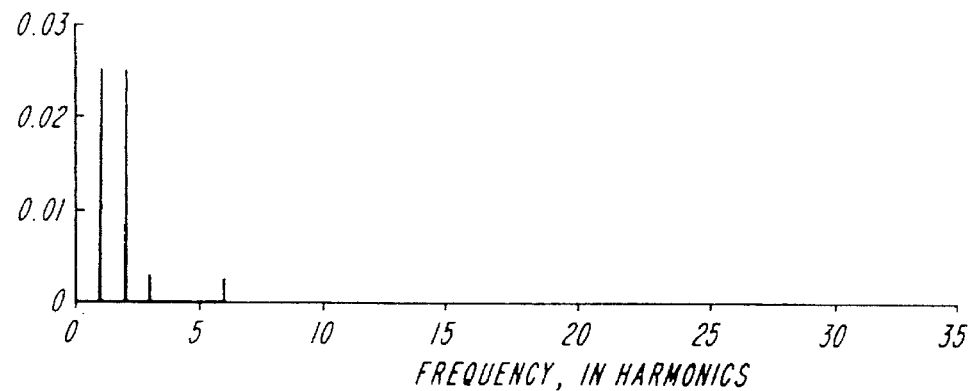
FIGS. 8A and 8B respectively show discrete and continuous (in log scale) calculated spectrum corresponding to the Markov chain of FIG. 7.
Figure 8B:
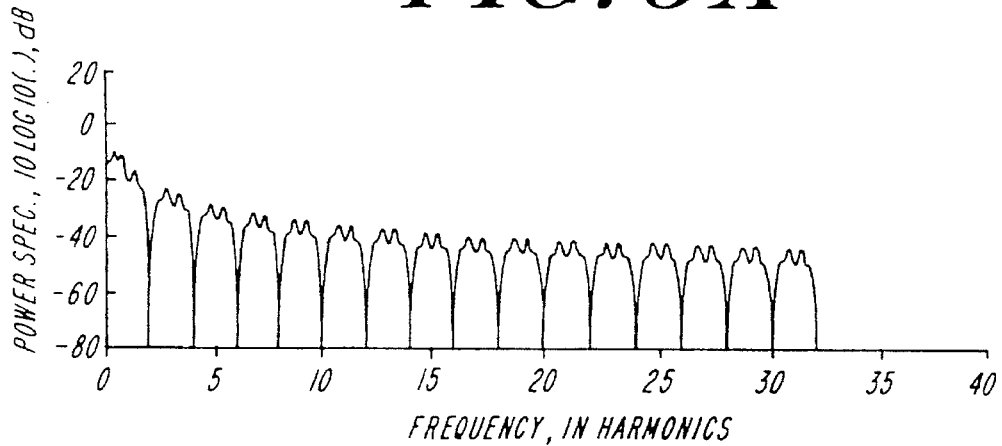

The discrete and continuous spectrum of the switching function corresponding to the example are shown in FIGS. 8A and 8B.

Figure 9:
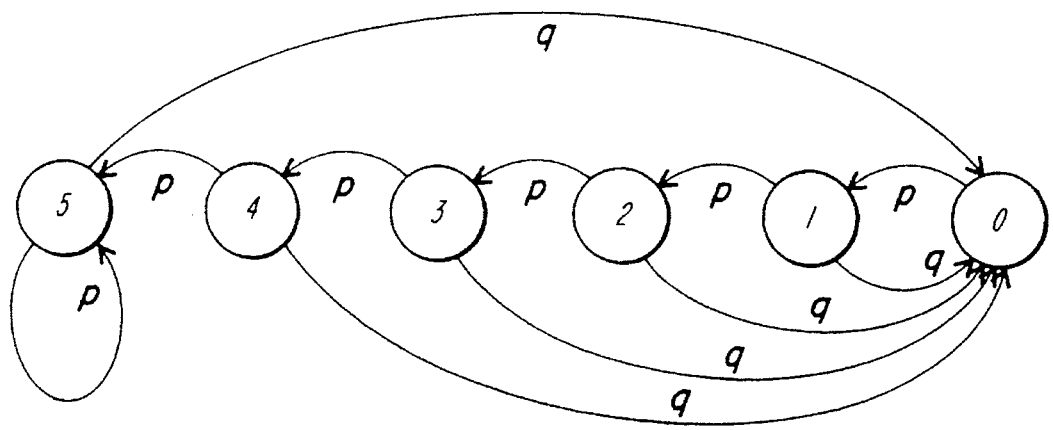
FIG. 9 shows a Markov chain corresponding to five successive L pulses.

The efficacy of Markov random modulation on the ripple reduction in this example can be compared with that of random independent PWM, in which a random choice between duty ratios of 0.25 and 0.75 is made. This discussion can be analogously modified to other cases of interest. In the case of independent choice between S pulses (with probability p) and L pulses (with probability q), the event "five successive long pulses" can be modeled with the Markov chain shown in FIG. 9, where state numbers denote the number of long pulses observed in a row. This chain is ergodic, and the limiting state probability of the state 5 is $\Pi_5 = p^5$, which in this example has a calculated value of 0.03125.

Figure 10A:
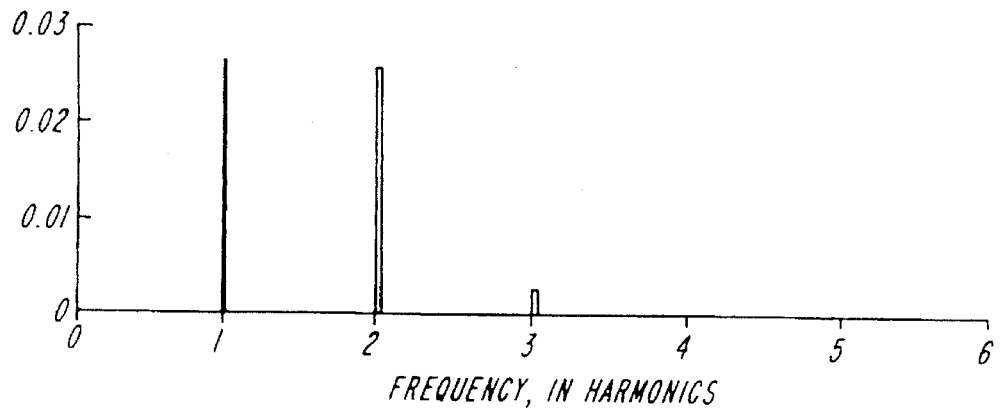
FIGS. 10A and 10B respectively show discrete and continuous (in linear scale) calculated spectrum in of the Markov chain of FIG. 7.
Figure 10B:
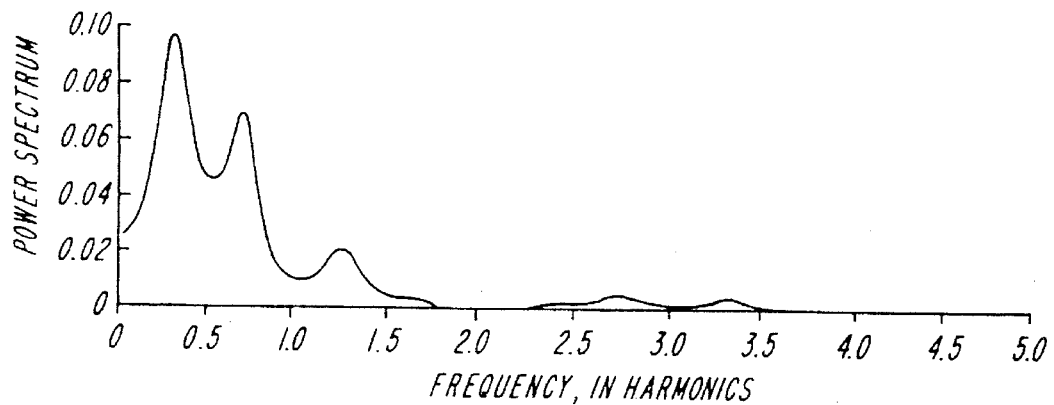

In the Markov random switching example shown in FIG. 7, the probability of observing 5 long pulses in a row after a random incidence is the product of $\Pi_1 = 0.2$ and the probability of having three more long pulses, $(0.25)^3$ which results as 0.003125. Thus, the application of a simple Markov chain reduces the probability of large deviations (from the expected value of the duty ratio) by an times. order of magnitude. Markov chain switching can reduce these deviations even further, for example, by setting the self-transition probabilities in states 1 and 4 to zero and adjusting to 1 the transition probabilities from state 1 to 2 and from 4 to 3 (the "hard reflector" case). A portion of the calculated power spectrum for the standard example from FIG. 7 is shown in FIGS. 10A and 10B on a linear scale.

Figure 11A:
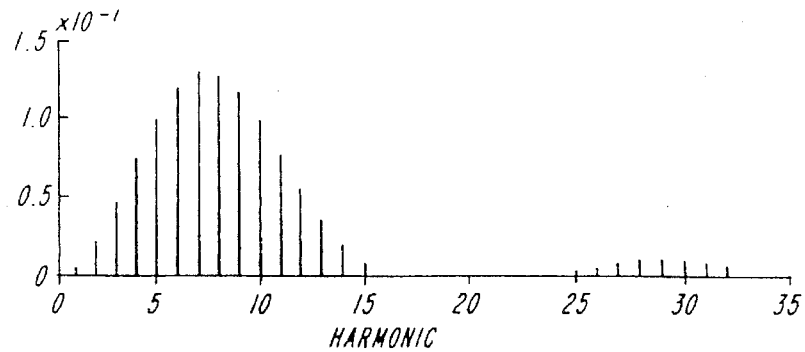
FIGS. 11A and 11B show duty ratio variation in the Markov chain of FIG. 7.
Figure 11B:
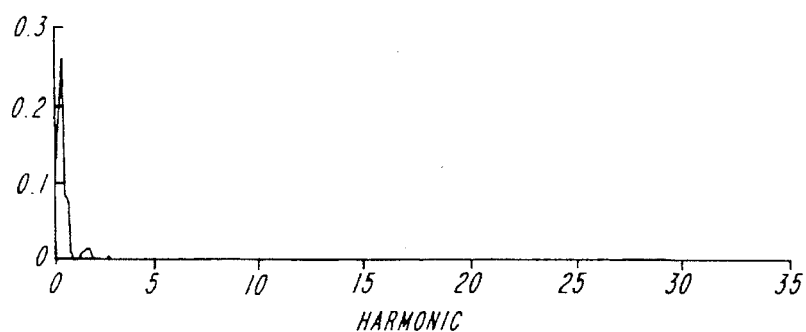
Figure 12A:
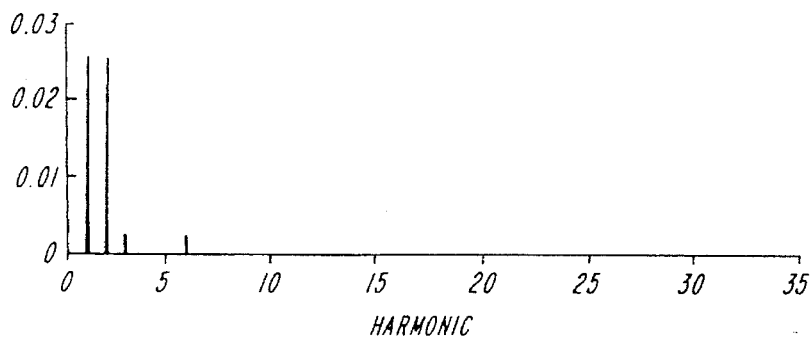
FIGS. 12A and 12B show transition matrix variation for the Markov chain of FIG. 7.
Figure 12B:
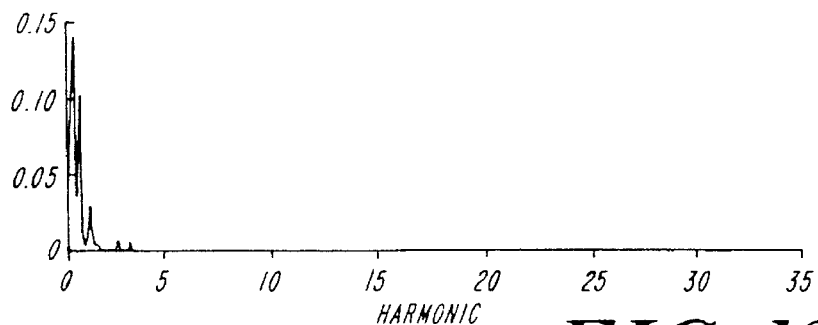

Variations in duty ratios in the example, while the average is fixed at D=0.5, have a large impact on the spectrum. Compare the results in FIGS. 11A and 11B, where $D_1=0.95$, $D_2=0.05$, with FIGS. 8A and 8B. The effects of changes in the matrix P* are much less pronounced. With reference to FIGS. 12A and 12B, if the probability of an L pulse after LL is 0.05 instead of 0.25, and symmetrically for an S pulse, the results are not much different from those in FIGS. 10A and 10B.

Figure 13:
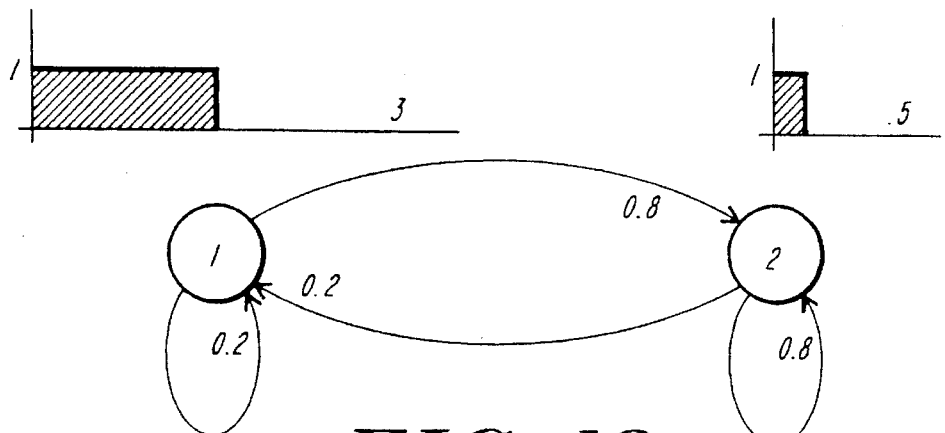
FIG. 13 shows an exemplary aperiodic Markov chain with asynchronous transitions.

As an example of an aperiodic Markov chain with asynchronous transitions, consider the chain shown in FIG. 13, with waveform durations $T_1=3$, $T_2=0.5$, duty ratio D=0.5. In this case $$\hat{Q}(f) = \begin{bmatrix} 0.2e^{i2\pi f/3} & 0.8e^{i2\pi f/3} \\ 0.2e^{i2\pi f/0.5} & 0.8e^{i2\pi f/0.5} \end{bmatrix} \quad (20)$$

and the greatest common denominator of the two waveform durations $$U(f) = \begin{bmatrix} e^{i2\pi f/0.750} \frac{\sin(\pi f/1.50)}{\pi f} \\ e^{i2\pi f/0.125} \frac{\sin(\pi f/0.25)}{\pi f} \end{bmatrix} \quad (21)$$

is T=0.5. The steady state probabilities are $\Pi_1=0.2$, $\Pi_2=0.8$. The calculated continuous spectral component (using equation (13)) and the full estimated spectrum are shown in FIG. 14. The discrete harmonic at f=2 is evident in the estimate, and is accurately predicted by equation (15).

Figure 15:
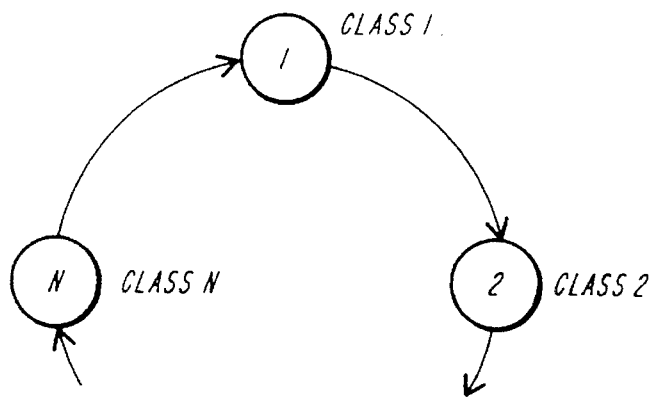
FIG. 15 shows a schematic representing state trajectory through classes of a periodic Markov chain.

The case of pulse trains specified by periodic Markov chains is now considered. The class of recursive Markov chains is analyzed, and it is assumed that the state of the chain goes through a sequence of N classes of states $C_i$, occupying a state in each class for the average time $T_i$, i=1, ..., N, where the $T_i$ are allowed to be different. An exemplary schematic representing state trajectory through classes of states of a periodic Markov chain is illustrated in FIG. 15. In the power electronic setup, periodic Markov chains are of interest in random modulation for DC/AC applications, where the basic (reference) on-off pattern changes from one cycle to the next in a deterministic fashion. This pattern is in turn dithered in each cycle using a set of dependent (Markovian) trials in order to satisfy time-domain constraints, for example to control ripple of waveforms of interest.

The conditioning used in the derivation of the power spectrum formula set forth previously has to be adjusted in the following manner. The probability that the state of the Markov chain belongs to the class $C_i$, after a random incidence, equals $T_i/\Sigma_{j=1}^N T_j$, where $T_j$ is the expected time spent in the class $C_j$, before a transition into the class $C_{j+1}$. It will be appreciated that after a possible renumbering of the states, the matrix Q for a periodic Markov chain can be written in a matrix form $$Q = \begin{bmatrix} 0 & Q_{12} & 0 & . & 0 \\ 0 & 0 & Q_{23} & . & 0 \\ . & . & . & . & . \\ 0 & 0 & 0 & . & Q_{N-1,N} \\ Q_{N,1} & 0 & 0 & . & 0 \end{bmatrix} \quad (22)$$

Let $T'' = \Sigma_{j=1}^N T_j$, and $\Pi^i$ denote the steady-state probabilities, conditional on the system being in class $C_i$, and let $\Theta_i = \text{diag}(\Pi^i)$. Then the following power spectrum is yielded:

$$S_x(f) = \frac{1}{T''} \left[ \sum_{i=1}^{N} \frac{T_i}{T''} U_i^H(f)\Theta_i U_i(f) + 2\text{Re}(1_N^T S_c 1_N) \right] + \quad (23)$$

$$\frac{1}{(T'')^2} \text{Re}(1_N^T S_d 1_N) \sum_{t=-\infty}^{\infty} \delta\left(f - \frac{1}{T''}\right)$$

where T' is the greatest common denominator of all waveform durations, $1_N$ is an N×1 vector of ones and $U_i$ is the vector of Fourier transforms of waveforms assigned to states in class $C_i$. A circular indexing process (i.e. modulo N) is used herein.

The matrix $S_c$ has a Toeplitz structure, with (k,l)-th entry $$S_{c,k,l}(f) = \frac{T_k}{T''} U_k^H(f)(I - \Lambda_k(f))^{-1}\Lambda_{k,l}(f) U_l(f) \quad (24)$$

where $\Lambda_k$ is a product of N matrices $$\Lambda_k = Q_{k-1,k} \cdots Q_{k,k+1} \quad (25)$$

and $$\Lambda_{k,l} = Q_{l-1,l} \cdots Q_{k,k+1} \quad (26)$$

with no repetitions allowed in $\Lambda_{k,l}$, so that the number of matrices forming $\Lambda_{k,l}$ is N−|k−l|. Also $$S_{d,k,l}\left(f = \frac{1}{T''}\right) = \quad (27)$$

$$\frac{T_k}{T''} U_k^H\left(f = \frac{1}{T''}\right) \Pi^k(\Pi^l)^T U_l\left(f = \frac{1}{T''}\right)$$

Figure 16:
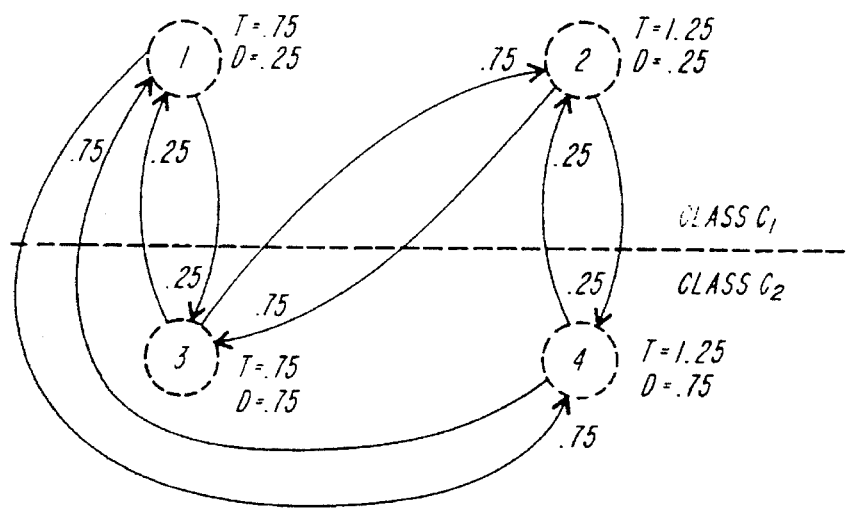
FIG. 16 shows an example of a periodic four state Markov chain with two classes and different cycle lengths.

The equation (24) is verified using the example shown in FIG. 16.

Figure 17:
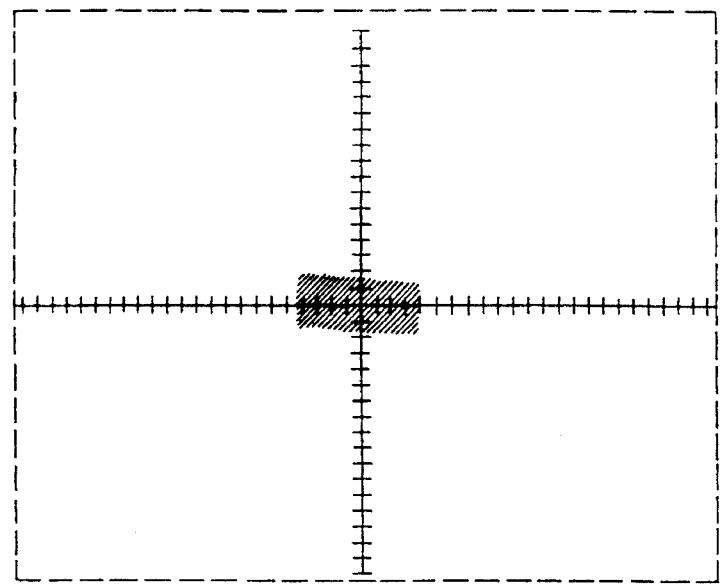
FIG. 17 shows experimentally observed ripple waveform of conventional modulation.
Figure 18:
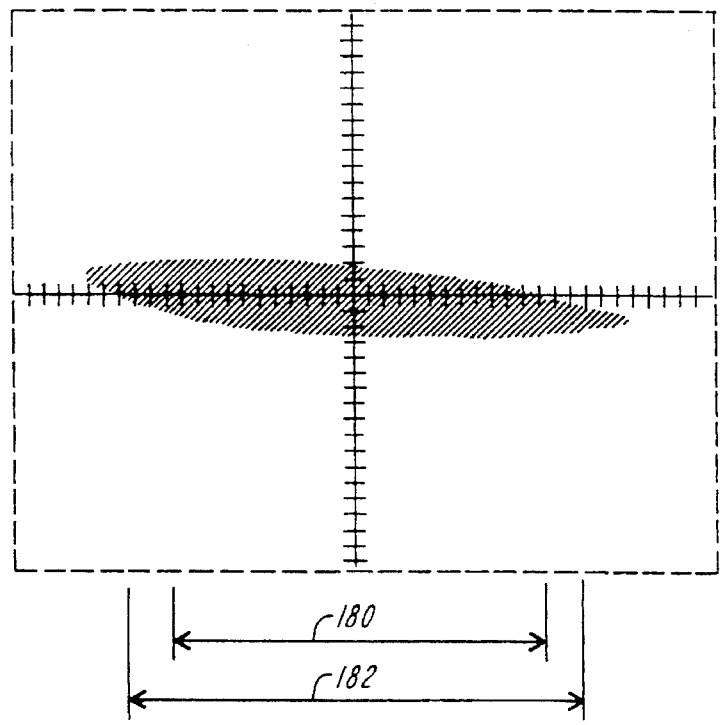
FIG. 18 shows experimentally observed ripple waveform of random modulation with Markov chain control.

The time-domain performance of both stationary and Markov random modulation is verified in a sequence of four experiments, using the circuit 40 shown in FIG. 4. With reference to FIGS. 17 and 18, the horizontal axis represents the inductor current ripple (1 A/div), and the vertical axis is the capacitor voltage ripple (0.5 V/div). The exposure time was set to 0.025 seconds, which (with the switching frequency of 10 kHz) corresponds to approximately 2500 pulses being traced on the screen. In FIG. 17 the results of conventional switching with the duty ratio D=0.5 is shown. The time waveform obtained when the modulation process is a random choice between D=0.25 and D=0.75, together with two random modulation processes governed by Markov chains are shown in FIG. 18.

A sequence of five pulses in succession with D=0.75 would account for a current ripple that extends approximately 4.5 divisions to the right of the coordinate origin. Markov modulation is expected to reduce the ripple, and that is indeed the case. FIG. 18 shows the inductor current ripple obtained with the four-state Markov chain described previously (the capacitor voltage ripple is not greatly affected) as indicated at 180. The current ripple can be further reduced if the modified Markov chain described above is used, as is shown in FIG. 18 as indicated at 182.

Accordingly, the present invention is described as a random switching procedure governed by Markov chains. The anticipated benefits of this switching process can be achieved in practice inexpensively, with costs that do not exceed costs of conventional random modulation procedures. As the cost of microcontrollers continues to decrease, while functionality and computational capability increase, the demonstrated benefits of random modulation based on Markov chains will become increasingly commercially viable.

The foregoing description has been set forth to illustrate the invention and is not intended to be limiting. Since modifications of the described embodiments incorporating the spirit and substance of the invention may occur to persons skilled in the art, the scope of the invention should be limited soley with reference to the appended claims and equivalents thereof.

What is claimed is:

1. In a power converter having an energy storage device which receives an input power from a source and provides an output power to a load, said converter including switching means for coupling said input power source to said energy storage device or coupling said storage device to said load in response to receiving a sequence of control signals generated from a control signal generator, said control signal generator comprising:

switching signal means for providing a nominal switching signal sequence which achieves steady state between said input power to said converter and said output power supplied to said load;

modulating means for modulating said nominal switching signal sequence with a source of non-deterministic signals to produce a time modulated switching signal sequence; and control means for controlling said modulation means in response to determining the previous modifications performed to said nominal switching signal sequence to maintain a predetermined range of deviation between said time modulated switching signal sequence and said nominal switching signal sequence.

2. The control signal generator of claim 1, wherein said control signals comprise a non-periodic signal sequence.

3. The control signal generator of claim 1, wherein said nominal switching signal sequence comprises a periodic set of waveform segments, each segment having time domain parameters including a predetermined total duration, a duty ratio representing the duration of an on-state switch pulse to the total duration of said segment, and a beginning of said on-state switch pulse with respect to a starting time instant of said segment.

4. The control signal generator of claim 3, wherein said modulating means modulates said waveform segments with a random signal sequence to produce said time modulated switching signal sequence including a non-periodic set of segments having randomized time domain parameters.

5. The control signal generator of claim 4, wherein said control means is operable for controlling said modulating means to restrict the randomness of said time modulated switching signal sequence by determining the time domain parameters for the next successive segment for said time modulated switching signal sequence based on the current and previous segments.

6. The control signal generator of claim 5, wherein said control means utilizes a predetermined probability model to determine the next successive segment of said time modulated switching signal sequence.

7. The control signal generator of claim 6, wherein said probabilistic model constrains said time modulated switching signal sequence to limit the deviation from said nominal switching signal sequence.

8. The control signal generator of claim 1, wherein said time modulated switching signal sequence comprises a set of on-state switching pulses of varying duration.

9. The control signal generator of claim 8, wherein said control means is operable for ascertaining the current and previous sequence of switching pulses and correlating same to a probability pattern.

10. The control signal generator of claim 9, wherein said probability pattern is predetermined.

11. The control signal generator of claim 9, wherein said probability pattern is variable.

12. The control signal generator of claim 9, wherein said control means is further operable for determining the next switching pulse duration of said time modulated switching signal sequence in accordance with said predetermined probability pattern.

13. The control signal generator of claim 1, wherein said modulating means comprises a random signal generator.

14. The control signal generator of claim 1, wherein said control means comprises a state machine.

15. The control signal generator of claim 1, wherein said modulating means and said control means comprise a programmable microprocessor.

16. A switching control system for use in a power converter which includes an energy storage device that receives and converts input power from a source and provides output power to a load, said power converter including a switch operable for coupling said input power source to said energy storage device in response to receiving a sequence of control signals generated from said switching control system, said switching control system comprising:

a switching signal sequence generator operable for generating a periodic switching signal sequence with which said converter achieves steady state; and a switching signal sequence modulator operable for modulating said periodic switching signal sequence with a non-deterministic timing sequence to produce a non-periodic time modulated switching signal sequence having a set of timing segments, and limiting the deviation of said time modulated switching signal sequence from said nominal switching signal sequence in accordance with correlating said timing segments with a predetermined probability pattern.

17. The system of claim 16, wherein said time modulated switching signal sequence comprises a set of timing segments which include time domain parameters of varying duration.

18. The system of claim 17, wherein each timing segment has time domain parameters including a predetermined total duration, a duty ratio representing the duration of an on-state switch pulse to the total duration of said segment, and a beginning of said on-state switch pulse with respect to a starting time instant of said segment.

19. The system of claim 17, wherein said modulator is operable for restricting the randomness of said time modulated switching signal sequence by determining the on-state switching pulse duration for the next successive segment for said time modulated switching signal sequence based on a correspondence of preceding timing segments with said probability pattern.

20. The system of claim 16, wherein said probability pattern serves to constrain said time modulated switching signal sequence to reduce the harmonics associated with said time modulated switching signal sequence.

21. The system of claim 16, wherein said probability pattern is predetermined.

22. The system of claim 16, wherein said probability pattern is variable.

23. A method of controlling a switching device in a power converter having an energy storage device which receives an input power from a source and provides an output power to a load, said switching device operable for coupling said input power source to said energy storage device in response to receiving a sequence of control signals, said method comprising the steps of:

providing a nominal switching signal sequence which achieves steady state between said input power to said converter and said output power supplied to said load;

modulating said nominal switching signal sequence with a source of non-deterministic signals to produce a time modulated switching signal sequence; and controlling said modulation in response to determining the previous modifications performed to said nominal switching signal sequence to maintain a predetermined range of deviation between said time modulated switching signal sequence and said nominal switching signal sequence.

24. A method of controlling a switch utilized in a power converter which includes an energy storage device that receives and converts an input power from a source and provides an output power to a load, said switch operable for coupling said input power source to said energy storage device in response to receiving a sequence of control signals, said method comprising the steps of:

generating a periodic switching signal sequence with which said converter achieves steady state;

modulating said periodic switching signal sequence with a non-deterministic timing sequence to produce a non-periodic time modulated switching signal sequence having a set of timing segments; and limiting the deviation of said time modulated switching signal sequence from said nominal switching signal sequence in accordance with correlating said timing segments with a probability pattern.

* * * * *